Figure 1:
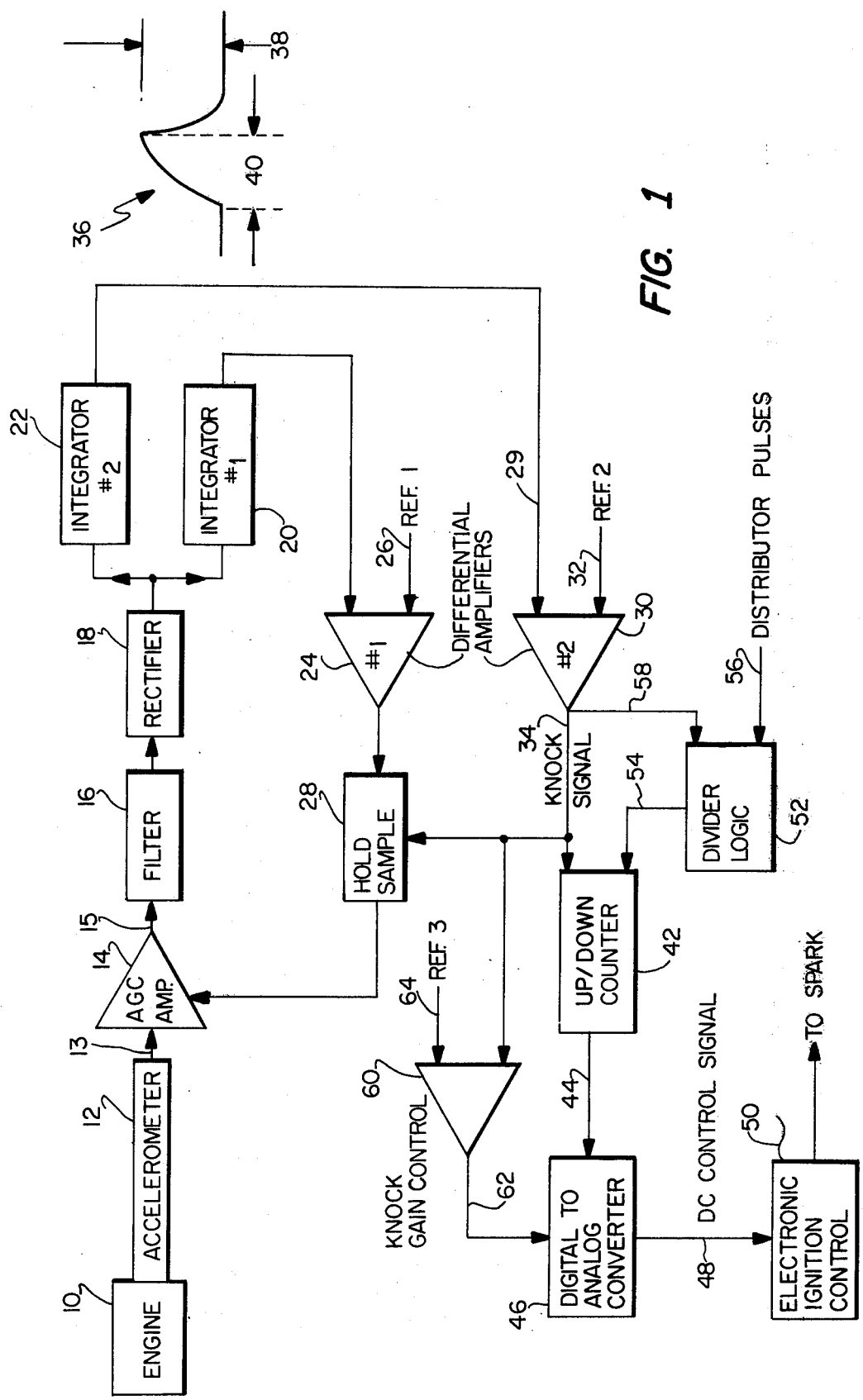

United States Patent [19]

King et al.

[11] 4,153,020
[45] May 8, 1979

[54] METHOD AND APPARATUS FOR SPARK CONTROL OF ENGINE KNOCK

[75] Inventors: William H. King, Florham Park; Bernhard J. Kraus, Freehold; Steven C. Belyo, Piscataway, all of N.J.

[73] Assignee: The United States of America as represented by the Administrator of the United States Environmental Protection Agency, Washington, D.C.

[21] Appl. No.: 819,077

[22] Filed: Jul. 26, 1977

[51] Int. Cl.² .............................................. G01L 23/22
[52] U.S. Cl. .................... 123/117 R; 73/35; 123/148 E; 123/146.5 A
[58] Field of Search ....... 123/117 R, 117 D, 146.5 A, 123/148 E; 73/35, 116

[56] References Cited

U.S. PATENT DOCUMENTS

| | | | |
|---|---|---|---|
| 3,120,218 | 2/1964 | Alquist | 123/146.5 A |
| 3,247,705 | 4/1966 | Wostl | 73/35 |
| 3,393,557 | 7/1968 | Brown et al. | 73/35 |
| 3,540,262 | 11/1970 | Wostl et al. | 73/35 |
| 3,576,526 | 4/1971 | Arnold et al. | 73/35 |
| 3,621,341 | 11/1971 | Lombardi | 73/35 |
| 3,822,583 | 7/1974 | Keller et al | 73/35 |
| 3,942,359 | 3/1976 | Arrigoni et al. | 73/35 |
| 4,002,155 | 1/1977 | Harned et al. | 123/148 E |
| 4,012,942 | 3/1977 | Harned | 123/117 R |

FOREIGN PATENT DOCUMENTS 1185499  3/1970  United Kingdom ................. 75/35

*Primary Examiner*—Kathleen H. Claffy
*Assistant Examiner*—Gerald J. Brigance

[57] ABSTRACT

Knocking sounds in an internal combustion engine are detected by a transducer, amplified, filtered to the knock frequencies, rectified and integrated to provide for each knock a DC pulse representative of the intensity of the knock. This DC pulse is fed to an up/down counter to step up the counter output voltage in proportion to the knock rate. After a delay the voltage in the counter is stepped down at a controlled rate by signals derived from the engine distributor. A net positive output of the up/down counter and knock intensity operate to proportionately retard the spark, which returns to its normal setting when the counter output is counted down to zero. Additionally an integrated knock signal is fed back to the signal amplifier to control amplifier gain as engine running noise varies. The time constants of the feedback circuit are sufficiently slow, and the amplifier gain control is inhibited by the presence of knock, such that amplifier gain is not modified by the short knock pulses. Thus knock pulses are amplified above a noise level which is otherwise maintained constant by the feedback circuit.

19 Claims, 1 Drawing Figure

METHOD AND APPARATUS FOR SPARK CONTROL OF ENGINE KNOCK

BACKGROUND OF THE INVENTION

The present invention relates to the automatic control of performance of spark ignited internal combustion engines and more particularly to a method and apparatus for retarding the spark of the engine when knocking occurs and to return the spark to its normal condition when knock ceases.

In the field of internal combustion engines, detonation, or knock, is an undesirable event. In the past it has been avoided by limiting compression ratio to 10.5:1 or less, and by providing gasoline with sufficient octane, up to 100 RON, to satisfy these engines. The unleaded gasoline required in 1975 and later vehicles is generally available only at lower octane, approximately 91 RON. This octane level will satisfy cars with compression ratios no higher than approximately 8:1. However, lowering compression ratio to 8:1 from the historic average of slightly over 9:1 involves a penalty of about 7% fuel economy.

Some of this lost fuel economy can be regained when a higher compression ratio is used along with other means to avoid knock at those conditions in which the engine is most knockprone, for example, at full throttle acceleration. Two known methods of avoiding knock are spark retard and use of exhaust gas recirculation. Both techniques lower the peak temperatures of combustion and therefore the tendency to knock. Accordingly both are suited to use with higher compression ratio engines.

Recent developments in electronic control over the ignition system for internal combustion engines has been the basis for utilizing spark retard as the means to eliminate or regulate engine knock. Knock can be detected in an engine by transducers, e.g. a strain gauge or accelerometer, placed on the engine, for example, on the main bearing cap, cylinder heads, intake manifold, or block. Knock causes a significantly larger than normal force which, as is known, is translated into a millivolt signal by the transducer. Knock is characterized by increased engine vibration generally in frequency ranges of 4000 to 6000 Hz and 9000–11,000 Hz, and transducers are selected to be responsive in those ranges. Knock might occur once in each engine cylinder for each firing of that cylinder. The amplitude of a knock pulse, in terms of the millivolt signals produced by the transducer, can be as much as twenty times greater than the signal of background noise produced by normal engine operation without knocking. Background noise varies in a generally direct relationship with engine space and load and knock pulses are characterized by as many as twelve cycles in the above frequency ranges, whose amplitudes are higher than background noise at that speed.

Many electronic spark control circuits have been developed in the past either for regulation of engine performance or for application in rating of gasoline. For example, U.S. Pat. No. 3,822,583 by Keller, et al. discloses an apparatus to measure knock ratings of gasoline and to indicate the octane requirements of an engine. This apparatus uses a transducer to pick up engine background noise and knock; these signals then are filtered in the preferred knock frequency range and amplified. The engine signals, including knock, are compared with the average background noise level and any positive difference produced by knock is integrated to provide a feedback signal to a servo device operating the spark control.

U.S. Pat. No. 4,002,155 by Harned and Herrick discloses a spark timing control using an engine mounted accelerometer to monitor knock. When knock pulses exceed a predetermined number, the spark is retarded. Spark is advanced when less than the predetermined number of knocks occur.

In these systems the knock signal level contributes to the comparison signal level, thus degenerating the comparator output and sensitivity to knock.

A spark control method and apparatus are needed which allow flexibility in control of parameters affecting performance such as degree of retard, sensitivity to knock, time of retard, speed of spark advance.

Additionally a method and apparatus for spark control are needed which provide a control signal output representative of knock rate and intensity regardless of engine background noise variations. Also a method and apparatus for spark control are needed which prevent control hunting when periods of knocking are separated by short intervals.

SUMMARY OF THE INVENTION

Knocking sounds in an internal combustion engine are detected by a transducer, amplified, filtered to the knock frequencies, rectified and integrated to provide for each knock a DC pulse representative of the intensity of the knock. This DC pulse is fed to an up/down counter to step up the counter output voltage in proportion to the knock rate. After a delay the voltage in the counter is stepped down at a controlled rate by signals derived from the engine distributor. A net positive output of the up/down counter, and knock intensity, operate to proportionately retard the spark, which returns to its normal setting when the counter output is counted down to zero. Additionally an integrated knock signal is fed back to the signal amplifier to control amplifier gain as engine running noise varies. The time constants of the feedback circuit are sufficiently slow, and the amplifier gain control is inhibited by the presence of knock, such that amplifier gain is not modified by the short knock pulses. Thus knock pulses are amplified above a noise level which is otherwise maintained constant by the feedback circuit.

Accordingly it is an object of this invention to provide a spark control method and apparatus which in the absence of knocking provides a constant spark setting regardless of engine background noise variations.

It is a further object of this invention to provide a spark control method and apparatus which is automatically responsive to knock intensity above the engine background noise.

Yet another object of this invention is to provide a spark control method and apparatus which provides automatic gain control of signals when knock is absent and fixed gain when knock is present.

Still another object of this invention is to provide a spark control method and apparatus which automatically retards the spark in response to both the intensity and rate of occurrence of knock signals.

A still further object of this invention is to provide a spark control method and apparatus which, when the spark has been automatically retarded because of knocking, delays return of the spark to a normal setting by a time period whose duration is directly related to the knock rate which induced the retarded spark condition.

Another object of this invention is to provide a spark control method and apparatus which is flexible in control of parameters affecting performance.

Other objects advantages and novel features of the present invention will become apparent from the following detailed description of the invention when considered in conjunction with the accompanying drawing in which:

FIG. 1 is a semi-schematic block diagram of the circuits for the spark control apparatus and method of this invention.

FIG. 1 shows a spark ignited internal combustion engine 10 having an accelerometer 12 attached thereto. The accelerometer 12 attaches to the engine 10 at an exterior location where vibratory forces within the engine 10 due to internal combustion are translated into AC voltage signals at the accelerometer output 13. Locations for attachment of the accelerometer 12 to the engine 10 which have provided satisfactory signals include engine cylinder heads, intake manifold, main bearing cap and block.

The AC signals from the engine 10 are first described herein for operation without the occurrence of knock. From the accelerometer 12, the signals 13 are amplified in an AC amplifier 14 having automatic gain control as explained more fully hereinafter. The output 15 of the AC amplifier 14 is fed to a band pass filter 16 which substantially passes only preferred signals, that is in the range of frequencies corresponding to knock. Knock frequencies are known to exist in the approximate ranges of 4000 to 6000 Hz and 9000 to 11,000 Hz although other knock frequencies also occur for different engine designs. The preferred, filtered AC signals are then rectified to DC in the rectifier 18 and divided along two parallel paths. One path leads to a first integrator 20 where a steady level of AC signal from the accelerometer 12 results in a proportionately steady state DC output from the first integrator 20. As engine background noise increases, due to an increase in engine speed or load, the output of the first integrator 20 tends to increase and vice-versa when engine noise decreases.

The output of the first integrator 20 provides one input to the first differential amplifier 24 having a first reference voltage input 26. The output of the first differential amplifier 24 is fed back through a hold sample 28 or inhibit control to the gain control of the AC amplifier 14. The output of the differential amplifier 24 increases or decreases directly as the output of the first integrator 20 varies, and the automatic gain control of the AC amplifier 14 reduces gain when feedback increases. Accordingly the outputs of the rectifier 18 and the integrators 20, 22 are maintained substantially constant, engine knock being absent. The hold sample control 28 has no effect on the gain of the AC amplifier 14 when knock is absent from the engine 10. Each element in this automatic gain control (AGC) loop is well known in the art and specific components may be selected to suit a particular engine application.

The constant amplitude signal 15 from the AC amplifier 14 also appears, after filtering and rectification, as aforesaid, at the output of the second integrator 22 where, without knocking, it is a steady state electrical background noise representative of the engine 10 operating at various speeds and loads. The magnitude of the reference voltage input 26 to the first differential amplifier 24 determines, through the AGC loop, the magnitude of the constant amplitude signals which are produced at the outputs of the two integrators 20, 22.

The output of the second integrator 22 is one input 29 to the second differential amplifier 30, which has a reference or threshold voltage input 32. The reference voltage 32 provides a zero output from the second differential amplifier 30 when there is no knock signal from the engine 10. The amplitude of the reference voltage 32 may be adjusted to any level so that a predetermined knock intensity in excess of the threshold voltage 32 provides a knock signal output 34 from the second differential amplifier 30. For example, the threshold voltage 32 may be set so that a knock signal 34 will result when an engine fuel is used which gives the lowest audible knock intensity which a trained octane rater can hear.

When knock occurs in the engine 10, the millivolt signal from the accelerometer 12, including both knock and background noise components, is amplified (14), filtered (16) to pass only frequencies in the knock range, rectified (18) and integrated in the parallel integrators 20, 22. The intensity of the knock vibrations generally far exceeds the intensity of the background noise of the engine at the speed of operation.

The responses in the outputs of the two integrators 20, 22 differ when knock occurs. Both are leaky integrators in that they fail to increase their outputs continuously in the presence of a continuous flow of input signals. When steady state background noise is present the voltage leaks off the integrators at the same rate as it is inputted so the integrator outputs are steady state as aforesaid. When knock signals, with approximately 12 to 18 AC cycles of increased amplitude, occur, the first integrator 20 having a long time constant relative to the short-lived knock shows a negligible response in its output and continues to furnish a signal to the AGC loop which remains representative only of the engine background noise.

On the other hand the second integrator 22, has a short time constant and responds to the higher intensity knock cycles by a buildup toward a new output level. However after each rectified cycle, the voltage leaks down partially before the next rectified cycle arrives to further increase the voltage. When the knock pulse has terminated, i.e. after as many as eighteen rectified AC cycles, the voltage output of the integrator 22 decays rapidly back to the steady state background noise level until another knock occurs. Accordingly the output of the integrator 22 is a knock pulse riding atop the steady DC level which is produced by the background noise. The DC knock pulse output waveform of integrator 22 is illustrated in FIG. 1 and given the reference number 36. The rising portion is shown smoothed-out; in actuality it is a series of small rising peaks, each peak caused by an AC cycle of knock as described above. The amplitude 38 of the pulse 36 is dependent on the intensity of the knock vibrations and the number of AC cycles within a knock pulse. The pulse width 40 results from the number of AC cycles within a knock pulse.

It should be apparent to those skilled in the art, that in an alternative embodiment of this invention in place of the leaky integrator 22 a conventional envelope following detector will also produce a suitable output pulse riding above the noise level. However such a detector will respond rapidly at its output to even a single AC cycle of knock whereas the leaky integrator 22 requires a longer duration knock pulse of several AC cycles to build up a voltage in excess of the threshold 32. Thus the leaky integrator 22 is more tolerant of short, low level knocks and is less quick to cause a spark adjustment, a feature which is used to prevent hunting of the control when only a minor and acceptable level of knocking occurs.

The knock waveform 36 is inputted to the second differential amplifier 30 and when the amplitude 38 of said waveform 36 exceeds the preselected threshold input voltage 32, there is produced a knock signal at the output 34 of the differential amplifier 30 similar in waveform to the pulse 36. This knock signal output 34 is inputted to the up/down counter 42, a device well known in the electronic art. The up/down counter 42 converts the knock signal pulse input 34 to a binary coded decimal control voltage output 44 which after further processing is used to retard spark timing. This counter 42 counts up every time a knock signal output pulse 34 is inputted, producing a binary output 44 which increases uniformly by one step each time an input 34 is received until an upper limit of output voltage 44 is reached.

This output voltage 44 from the up/down counter 42 drives the digital to analog converter 46 which generates a DC voltage output 48 having an amplitude which depends in major part on the instantaneous level at the output 44 of the up/down counter 42. When the up/down counter 42 is at its zero stop, that is, the output 44 is zero, the output of the digital to analog converter 46 is zero and the electronic ignition control 50 will set the spark timing at the manufacturer's specified setting. When the up/down counter 42 outputs a binary number signal in excess of zero, the digital to analog converter 46 provides an analog signal 48 which cause a measure of spark retard.

The divider logic 52 inputs a series of pulses 54 to the up/down counter 42; each pulse causes the up/down counter 42 to count down by one step, although never below the counter's zero stop. The basic source of the divider logic output pulses 54 are pulses 56 inputted continuously from the engines distributor (not shown). Thus this distributor input 56 varies in frequency with engine speed, each distributor pulse corresponding with the sparking of an engine cylinder. In the divider logic 52 a divider circuit (not shown) receives the stream of distributor pulses, 56 and outputs pulses 54 at a frequency which is a predetermined submultiple of the distributor input frequency. Thus the countdown inputs 54 to the up/down counter 42 are at a lesser rate than knock signals which would be produced, for example, if every cylinder were to knock on every firing. In such a situation the additive knock signal inputs 34 far exceed the subtractive inputs 54 and the up/down counter 42 reaches its upper output limit and remains there until an automatic retard adjustment in spark timing, or other change in engine conditions, reduces knock to the frequency of occurrence where the substractive inputs reduce the output 44 of the up/down counter 42. When engine knocking is completely eliminated or is at widely spaced intervals the divider logic circuit 52 counts the up/down counter 42 down to zero and the spark is returned to its original settings. Basically speaking the divider logic 52 is continuously feeding subtractive pulses 54 to the up/down counter 42 and additive pulses 34 are inputted on the occurrence of every knock signal which exceeds the threshold level 32. The netted output 44, always in the range of zero to the maximum limit of the counter 42, produces a response in the digital to analog converter 46 to retard the spark, and reduce knock, whenever the up/down counter output 44 is other than zero.

The divider (not shown) within the divider logic 52 is clocked by the distributor as aforesaid. Within said divider, distributor derived pulses 56 are counted; the count to a preselected number produces one subtractive output pulse 54 to the up/down counter, and the count in the divider begins again repetitively. A knock signal 34 from the second differential amplifier 30 resets the counter within the divider logic 52 back to zero so that immediately following every knock signal 34 there is always a delay of substantially predetermined duration before the next subtractive pulse 54 acts to reduce the output of the up/down counter 42. Regardless of the output level of the up/down counter 42, a new knock signal 34 causes a fixed delay in the arrival of the next count down pulse 54. Thus even one knock pulse above threshold will count up and affect the spark timing before it can be counted down.

Knock signals out of the second differential amplifier 30 also are inputted to the knock gain control amplifier 60, having an output 62 which in turn proportionately affects the output 48 of the digital to analog converter 46 when the knock signal 34 exceeds the gain control threshold 64. Thus a high rate of knock affects the spark adjustment via the up/down counter 42 and and at the same time a high intensity of knock affects spark adjustment via the knock gain control amplifier 60.

In addition the circuits are programmed such that selected knock signals 44 from the up/down counter 42 are weighted preferentially in the digital to analog converter 46 to produce desired spark timing responses. For example, in an embodiment of this invention which performed satisfactorily a count up on the up/down counter output 44 from binary 000 to 0001, for example a first knock, produced a 3° spark retard. A next countup from 0001 to 0010, for example a second knock and prior to a first countdown pulse from the divider logic 52, added an additional 2° of retard to the spark for a total retard of 5°. All other up steps adding 0001 to the output of the counter 42 added 2° of retard up to a selected maximum. Every down pulse 54 of 0001 subtracted 2° from the retard setting except in counting down the final step from 0001 to 0000, a 3° advance was made. Thus the first knock produced the greatest output step 48 in adjustment of spark retard.

It is noteworthy that as engine speed increases, knock rate is subject to increase, but the rate of subtractive pulses 54 clocked by the distributor are also increased, and vice-versa when engine speed decreases.

The electronic ignition control 50 may be of any known type which enables advance and retard of sparking in response to a voltage signal. It is not a novel part of the subject invention and accordingly is not described in detail herein. Similarly the actual circuitry of the functional elements of FIG. 1 are not described herein.

It is to be understood that the preceding description is by way of illustration and example and is not to be taken as a limitation to the spirit and scope of this invention. For example in an alternative embodiment of this invention, the divider logic 52 may include two dividers, the first, as described above, producing output pulses as a submultiple of the distributor frequency. The first divider output inputs to the second divider which outputs pulses at a rate which is a submultiple of the rate of the first divider. In operation of the divider logic 52, the knock signal 58 resets both dividers, and the first subsequent pulse from the second divider is the first subtractive pulse input 54 to the up/down counter 42. Thereafter the up/down counter is fed substractive pulses 54 at a faster rate from the first divider. Each knock signals 58 resets the dividers and sends the next subsequent subtractive output from the second divider to the up/down counter 42. In this alternative embodiment, after each knock, the second divider provides for a longer delay prior to the first subtractive pulse and prevents rapid fluctuations in the retard settings.

In another alternative embodiment of this invention a comparator replaces the second differential amplifier 30 or said amplifier 30 is biased for a saturation output for even the lowest knock intensity above the threshold 32. The knock gain control 60 is eliminated. In this alternative embodiment the degree of spark retard is affected only by the number of knocks 34 occuring and not by the knock intensity. It has operated satisfactorily when the knock amplitude above the background noise is substantially constant regardless of engine speed and load.

In another alternative embodiment of this invention, the accelerometer is selectively tuned to the knock frequency range. In another alternative embodiment of this invention parallel filters are employed, one filter tuned to the lower range of knock frequencies, e.g., 4000 to 6000 Hz and the other filter tuned to the higher range of knock frequencies, e.g. 9000 to 11,000 Hz, and the filter outputs are combined for further processing.

In yet another alternative embodiment of this invention the hold sample control 28 is eliminated from the AGC loop, the time constant in the first integrator 20 being sufficiently long relative to the knock pulse such that gain of the AC amplifier 14 is unaffected by the knock pulse.

In yet another alternative embodiment of this invention, for applications where engine background noise remains substantially constant during knocking, that is when the engine knocks substantially at only one operating condition, the AGC loop is eliminated i.e. integrator 20, amplifier 24 and hold sample control 28, and the AGC amplifier 14 is replaced by a constant gain amplifier.

It is also within the spirit of this invention to use a transducer other than an accelerometer; for example, strain gauges and cylinder pressure sensors may also be used. And a plurality of transducers may be used with their outputs combined.

In summarizing, the apparatus immediately retards the spark setting for any knock exceeding the threshold, waits for a predetermined period and if no further knocking has occurred returns the spark setting. Further knocking causes an additional step of retard setting, for each knock, and another waiting period following each knock after which the spark is returned to normal in steps corresponding to the number of knocks which have caused the retarded spark condition. An additional knock occurrence always interrupts and delays the return of the retarded spark setting to normal. The apparatus may be seen to perform in a manner comparable to a person manually operating a spark retard lever while driving an old model automobile.

What is claimed:

1. An apparatus for automatic control of spark setting in order to correct for knocking in a spark-ignited internal combustion engine having an electronic ignition control comprising:

means for producing pulsed knock signals when said knocking occurs, each said knock pulse signal being representative of one said engine knock;

logic means for outputting logic pulses in response to input pulses dependent upon the distributor controlled ignition rates, the output rate being less than said distributor-controlled engine ignition rate, said distributor cooperating with said electronic ignition control;

an up/down counter device receiving said knock signal outputs from said means for producing pulsed knock signals and said output pulses from said logic means, said counter device additively counting up for each knock signal received, said counter device subtractively counting down for each logic output pulse received, whereby the output of said counter device is the instantaneous sum of said additive and substractive input signals and pulses;

means for applying said up/down counter device output to said electronic ignition control of said engine whereby the spark setting of said engine is retarded when said counter device outputs a finite signal, and said spark setting is not retarded when said counter device output is zero, and the degree of said spark retardation is proportioned to the magnitude of said instantaneous counter device output, whereby the spark setting is responsive to the rate of knock occurrence.

2. The apparatus of claim 1 wherein each of said knock pulse signals causes a delay of said next output pulse from said logic means.

3. The apparatus of claim 1 wherein said output of said counter device is limited, never being less than zero.

4. The apparatus of claim 1 wherein said means for producing knock pulse signals includes:

a transducer sensing said knocking and running background noise in said engine, and providing electrical output signals representative of said knocking and said background noise, said knock signals exceeding said background noise signals in amplitude;

AC amplifier means for amplifying said knocking and said background noise signals;

a tuned filter, preferentially passing signals from said AC amplifier, said preferred signals being in the frequency range of said knock signals;

a rectifier for rectifying said AC signals passed through said filter;

first integrator means for integrating said rectified signals from said filter, said first integrator means outputting a steady state signal representative of said background noise when said knocking is absent, and outputting a pulsed signal when said knocking occurs, each of said pulses representing one said engine knock, the amplitude of said pulse rising above said steady state signal a first differential device for receiving said output of said first integrator and providing said knock pulse signal output when said output of said first integrator exceeds a predetermined threshold, said threshold level being exceeded only upon the occurrence of said knock in said engine;

5. The apparatus of claim 1 wherein the output of said up/down counter is in binary coded decimal format and said means for applying said output to said electronic ignition control includes a digital to analog converter.

6. The apparatus of claim 5 wherein the output from said digital to analog converter is weighted whereby the counter output signal resulting from any selected knock pulse signal causes a greater degree of retardation of spark setting than does another knock pulse signal, and the counter output signal resulting from any selected logic output pulse causes a greater degree of spark setting return than does another logic output pulse.

7. The apparatus of claim 4 further including:
automatic gain control means for said AC amplifier;
second integrator means for integrating said rectified signals from said filter, said second integrator means outputting a steady state signal representative of said engine running background noise, said output of said second integrator means not responding to said engine knocking;
differential amplifier means amplifying said second integrator output, the output of said differential amplifier means being fed back to the automatic gain control means of said AC amplifier,
whereby the output from said AC amplifier remains constant as the ampltitude of said engine background noise varies.

8. The apparatus of claim 7 further including a hold sample control device receiving knock inputs from said first differential device and inputting to said AC amplifier whereby the occurrence of a knock signal maintains a constant gain on said AC amplifier during said knock.

9. The apparatus of claim 5 further including a knock gain control receiving said knock pulse signals from said first differential device, the output of said knock gain control acting on said digital to analog converter, whereby the output of said digital to analog converter is proportionate to the intensity of said engine knocking.

10. The apparatus of claim 2 wherein said delay pulses from said logic means to said up/down counter device is longer for the first pulse immediately following a knock occurrence than the time period between subsequent pulses from said logic means, additional intervening knock pulses being absent.

11. The apparatus of claim 4 wherein said first differential device is a differential amplifier.

12. The apparatus of claim 4 wherein said first integrator means is a leaky integrator.

13. The apparatus of claim 4 wherein said first integrator means is an envelope detector.

14. The apparatus of claim 4 wherein said threshold level for said first differential device is adjustable.

15. The apparatus of claim 7 wherein said second integrator is a leaky integrator.

16. The apparatus of claim 1 wherein the rate of pulses from said logic means is variable.

17. The apparatus of claim 8 wherein each of said knock pulse signals causes a delay of said next output pulse from said logic means.

18. A method for automatic control of spark setting in order to correct for knocking in a sparkignited internal combustion engine having an electronic ignition control comprising the steps of:
(a) sensing said knocking in said engine;
(b) producing knock signals when said knocking occurs, each said knock signal being representative of one said engine knock;
(c) providing logic pulses at a rate dependent upon the distributor controlled ignition rate, said pulse rate being less than said distributorcontrolled engine ignition rate, said distributor cooperating with said electronic ignition control;
(d) inputting said knock signals and said logic pulses into an up/down counter, said counter additively counting up for each knock signal received, said counter substractively counting down for each logic pulse received, whereby the output of said counter is the instantaneous sum of said additive and substractive input signals and pulses;
(e) applying up/down counter output to the electronic ignition control of said engine whereby the spark setting of said engine is retarded when said counter outputs a finite signal, and said spark setting is not retarded when said counter output is zero, and the degree of said spark retardation is proportioned to the magnitude of said instantaneous counter output.

19. The method of claim 18 further comprising the step of delaying the first logic pulse immediately following the occurrence of a knock.

* * * * *